Patented May 15, 1951

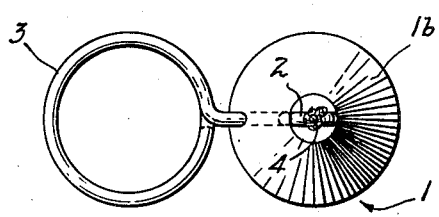
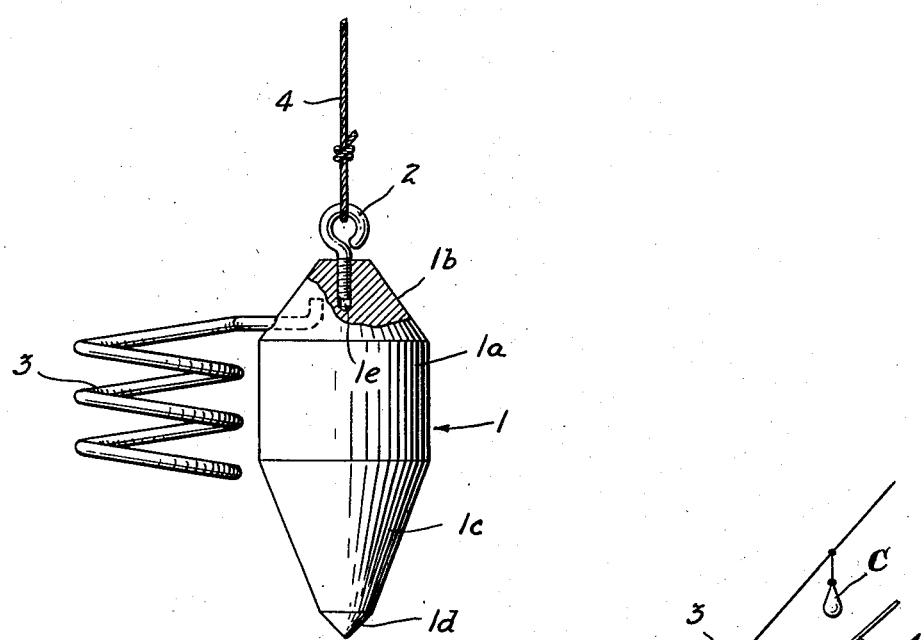
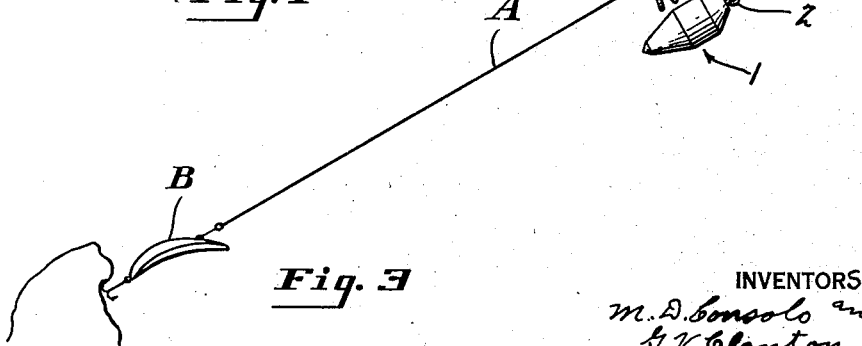

2,553,173

UNITED STATES PATENT OFFICE 2,553,173

FISH LURE AND HOOK RETRIEVER

Michael D. Consolo, Wilkinsburg, and George V. Clanton, Jamestown, Pa.; said Consolo assignor to said Clanton Application July 25, 1947, Serial No. 763,484

3 Claims. (Cl. 43—17.2)

The invention relates to an improved device for retrieving fish lures and hooks. In many fishing waters the fisherman encounters submerged stumps, tree branches, rock crevices and the like on which his lure or hook may become snagged with resultant loss of time and often of his lure and at least a portion of his line.

The object of this invention is to provide a device of simple and durable construction which can be manipulated easily and rapidly in use and is highly effective for the release of snagged lures and hooks.

In its preferred form the invention comprises a metal body or weight that preferably is elongated, circular in transverse section and with tapered ends, means at one end of the weight for attachment of a control cord, and a metal loop, preferably in the form of a spring coil, having one end fixedly attached to the weight to maintain the loop laterally opposite the elongated weight and its other end open to permit a portion of a fishline at any point between its ends to be inserted into the loop so that the line may guide a gravity-energized movement of the device.

The following description, in connection with the accompanying drawings, will more fully explain the improved device, the principle upon which it operates and the preferred methods of making and using it; and the invention sought to be covered will be particularly pointed out in the appended claims.

In the drawings,

Fig. 1 is a side elevation of a device embodying the invention, a portion of one of the parts being shown in axial section.

Fig. 2 is a plan view of the device shown in Fig. 1.

Fig. 3 is a view illustrating the method of using the improved device.

Referring in detail to the construction shown in the drawing, 1 generally designates an elongated metal body or weight which has a cylindrical middle section 1a, a conically tapered upper section 1b and similarly tapered lower sections 1c, 1d. The weight 1 may be cast of lead or other metal but for ease and low cost of fabrication highly satisfactory results have been secured by the use of zinc base alloy of the class containing aluminum up to about 4%, copper up about 1% and (optionally) a fractional percentage of magnesium. This metal can readily be die cast with smooth exterior surfaces. When formed of the specified alloy the body 1 may appropriately have a weight of about nine and one-half ounces.

A hole 1e is drilled and tapped in the upper end of the body 1 to receive a screw eye 2 for the attachment of a control cord to be further referred to later in the description.

Associated with the body 1 is a spring wire loop 3 which is preferably in the form of a multiple turn coil as shown and has its upper end extended laterally and rigidly embedded in the body 1 when the latter is cast. The lower end of the loop or coil 3 is open and the loop or coil preferably has a diameter large enough to pass over the body part of fish lures of the usual range of sizes so as to reach and engage one or another of the lure hooks. The loop or coil must be large enough, of course, to pass over the sinker usually attached to the fish line above the hook or lure.

In the use of the improved device to disengage a snagged lure or hook a control cord 4 is attached to the eye 2 of the device and the procedure may be as illustrated in Fig. 3. The fisherman, having discovered that his hook or lure is snagged, grasps the body of the retriever in one hand and with the other hand grasps any part of the fishline A between the end of the fish rod (not shown) and the lure B and, by simple and rapid winding movement of the line, effects its insertion through the loop or coil of the retriever. The control cord 4 having previously been attached to the body or weight part of the retriever the fisherman now grasps the control cord with one hand while with the other he lifts the rod, draws the fishline taut, usually at an inclination, and then releases the control cord to slip freely through his hand as the retriever slides by gravity down the fishline as a guide to pass over the sinker C and strike the lure or hook with a sharp impact. One blow of the device is often sufficient to disengage the snagged hook but in some cases it may be necessary for the fisherman to repeat the operation by drawing the retriever up the fishline and again releasing it. The yielding spring character of the loop part of the device prevents fracture of the lure or hook while, at the same time, the energy of the blow struck by the retriever is effectively applied for the intended purpose.

It will be observed, in Fig. 1, that the spring loop or coil part of the device is disposed laterally opposite the center of gravity of the body or weight 1 of the device with the top turn of the coil at a level considerably higher than said center. Consequently in the operation of the device, as illustrated in Fig. 3, the coil serves to sustain and guide the body with its longitudinal axis approximately parallel to the taut fishline so that the body enters and moves through the water with a minimum of resistance and is highly effective in delivering the required blow to the lure or hook. The lower end taper 1c, 1d of body 1, in addition to its function of reducing resistance to movement of the body through the water, is designed to afford a powerful wedge action in case the lure may be snagged in a cleft between submerged rocks, tree roots or the like. To this end the lower portion 1c, 1d extends well below the lower end of the loop or coil 3. The simple and rugged character of the device is apparent.

It is to be understood that the invention is not limited to the specific form of construction illustrated in the drawing and above described but that the said construction may be varied within the proper bounds of the appended claims.

What is claimed is:

1. A retriever comprising an elongated body substantially symmetrical about a longitudinal axis thereof and having an upper part with attaching means for a control cord, a downwardly tapered lower part and an intermediate part that includes the maximum transverse dimension of the body; and a multiple-turn spring coil having its upper end fixedly attached to the said body to position the coil and body in side-by-side relation with their axes substantially parallel, and with the curved portions of the coil spaced from the side of the body, the fixedly attached upper end of the coil providing its sole means of attachment to the body and the lower unattached end of the coil being considerably higher than the lower end of the body.

2. A retriever as claimed in claim 1 in which the upper turn of the coil is considerably higher than the center of gravity of the body.

3. A retriever as claimed in claim 1 in which the upper part of the body is upwardly tapered.

MICHAEL D. CONSOLO.
GEORGE V. CLANTON.

REFERENCES CITED

The following references are of record in the file of this patent:

UNITED STATES PATENTS

| Number | Name | Date |
| --- | --- | --- |
| 892,730 | Immell | July 7, 1908 |
| 1,044,792 | Levy | Nov. 19, 1912 |
| 2,074,057 | Kempe | Mar. 16, 1937 |
| 2,135,847 | Rosenquist | Nov. 8, 1938 |
| 2,316,500 | Bray | Apr. 13, 1943 |
| 2,443,061 | Waltamath | June 8, 1948 |